United States Patent
Chen et al.

(10) Patent No.: US 9,513,518 B2
(45) Date of Patent: Dec. 6, 2016

(54) DISPLAY DEVICE

(71) Applicant: AU Optronics Corp., Hsin-Chu (TW)

(72) Inventors: Chia-Fang Chen, Hsin-Chu (TW);
Yu-Hao Chen, Hsin-Chu (TW);
Po-Yuan Shen, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 0 days.

(21) Appl. No.: 14/659,635

(22) Filed: Mar. 17, 2015

(65) Prior Publication Data

US 2016/0202534 A1 Jul. 14, 2016

(30) Foreign Application Priority Data

Jan. 13, 2015 (TW) .............................. 104101093 A (51) Int. Cl.
*G02F 1/1345* (2006.01)
*G02F 1/1339* (2006.01)
(Continued)

(52) U.S. Cl.
CPC ......... *G02F 1/13454* (2013.01); *G02F 1/1339* (2013.01); *G02F 1/1368* (2013.01); *G02F 1/133512* (2013.01)

(58) Field of Classification Search
CPC .. G02F 1/1339; G02F 1/1341; G02F 1/1345; G02F 1/13452; G02F 1/13454; G02F 1/133512; G02F 1/133555; G02F 1/13306; G09G 3/3677; G09G 3/3648; G09G 3/3266; G09G 3/3674; G09G 3/3659; G09G 3/3225; G09G 2300/0408; G09G 2300/0426; G09G 2300/08; G09G 2310/0286; G09G 2310/0267; G09G 2310/0281; G09G 2310/0289; G09G 2310/0291; G11C 19/28; G11C 19/184; G11C 19/287; G11C 19/00; G11C 27/04

USPC .......... 349/153, 42, 43, 149, 151, 152, 110; 345/100, 213, 92, 205, 214, 204, 208, 345/55, 87; 377/64, 79, 68, 67, 75
See application file for complete search history.

(56) References Cited

U.S. PATENT DOCUMENTS 7,460,199 B2 12/2008 Tsuchiya
7,480,022 B2 1/2009 Tsuchiya
(Continued)

FOREIGN PATENT DOCUMENTS

JP 2004-29220 A 1/2004
JP 200599541 4/2005
(Continued)

OTHER PUBLICATIONS

Office Action issued in a corresponding Taiwan patent application on Aug. 2, 2016.

*Primary Examiner* — Thoi Duong
(74) *Attorney, Agent, or Firm* — McClure, Qualey & Rodack, LLP (57) ABSTRACT

A display device includes a first substrate, a gate driver on array (GOA) circuit, a plurality of peripheral conductive wires, a second substrate, a sealant and a semi-transparent pattern. The GOA circuit is disposed in a gate driver region, and includes a plurality of thin film transistor devices. The peripheral conductive wires are disposed in a peripheral region of the first substrate, and the peripheral conductive wires are electrically connected to the GOA circuit. The sealant is disposed in at least a portion of the peripheral region and a portion of the gate driver region, and the sealant overlaps at least a portion of the peripheral conductive wires and a portion of the thin film transistor devices of the GOA circuit in a vertical direction. The semi-transparent pattern is disposed on the second substrate, and a transmittance of the semi-transparent pattern is between 10% and 80%.

10 Claims, 10 Drawing Sheets

(51) Int. Cl.
*G02F 1/1368* (2006.01)
*G02F 1/1335* (2006.01)

(56) References Cited

U.S. PATENT DOCUMENTS

| | | |
|---|---|---|
| 7,868,987 B2 | 1/2011 | Kamiya |
| 8,421,983 B2 | 4/2013 | Jung |
| 8,866,224 B2 * | 10/2014 | Shin ................ H01L 33/48 257/343 |
| 2002/0167634 A1 | 11/2002 | Watanabe |
| 2005/0151899 A1 | 7/2005 | Chou |
| 2007/0291216 A1 | 12/2007 | Chan |
| 2010/0053533 A1 | 3/2010 | Fan |
| 2010/0079718 A1 | 4/2010 | Sekiya |
| 2016/0055814 A1 * | 2/2016 | Yang ................ G09G 3/3677 345/213 |

FOREIGN PATENT DOCUMENTS

| | | |
|---|---|---|
| KR | 1020090122092 | 11/2009 |
| TW | I259308 | 8/2006 |
| TW | 201039028 | 11/2010 |

* cited by examiner

DISPLAY DEVICE

BACKGROUND OF THE INVENTION

1. Field of the Invention

The present invention relates to a display device, and more particularly to a display device for realizing narrow border or borderless design.

2. Description of the Prior Art

A conventional display device such as a liquid crystal display device mainly includes an array substrate, a counter substrate, and a liquid crystal layer disposed between these two substrates. The array substrate and the counter substrate are combined by a sealant, and the sealant is used to seal the liquid crystal layer between these two substrates. The array substrate has a display region and a peripheral region disposed outside the display region. A pixel array is disposed in the display region for providing display images, peripheral conductive wires such as gate lines or data lines are disposed in the peripheral region, and driver chips such as gate driver chips or data driver chips are disposed in the peripheral region. Light-shielding patterns such as black matrixes are disposed on a position of the counter substrate corresponding to the peripheral region so as to shield gate driver circuits and the peripheral wires. The sealant is a kind of UV curable material which has to be fully irradiated by UV light for generating adhesive effects. Light cannot penetrate the light-shielding pattern on the counter substrate, and the UV light has to penetrate the peripheral region of the array substrate for curing the sealant. The peripheral conductive wires such as the gate lines and the data lines are metal lines which block light, and a transmittance of the peripheral region in the array substrate has to be high enough, such as higher than 50%, for fully curing the sealant with UV light irradiation. For high transmittance, spacing between the peripheral conductive wires has to become larger or there have to be mesh openings in the peripheral conductive wires, but the area of the peripheral region has to be expanded relatively. Additionally, the traditional gate driver chips are replaced by gate driver on array (GOA) circuits in recent display devices for reducing the cost of the driver chips. In the GOA circuit design, circuits for driving gate electrodes are directly manufactured on the array substrate, and the area of the peripheral region in the array substrate also has to be increased for the GOA circuit design.

Accordingly, the area of the peripheral region in the array substrate has to be increased for the purposes of increasing the spacing between the peripheral conductive wires, having mesh openings in the peripheral conductive wires, or disposing the GOA circuits. However, the increased area of the peripheral region conflicts with the narrow border or borderless design of the display device.

SUMMARY OF THE INVENTION

It is one of the objectives of the present invention to provide a display device which can realize a narrow border or borderless design.

A display device is provided in one embodiment of the present invention. The display device includes a first substrate, a pixel array, a gate driver on array (GOA) circuit, a plurality of peripheral conductive wires, a second substrate, a sealant, a display medium layer, a semi-transparent pattern, and a light-shielding pattern. The first substrate has an active region, a gate driver region, and a peripheral region. The peripheral region is disposed on at least one side of the active region, and the gate driver region is disposed between the active region and the peripheral region. The pixel array is disposed in the active region of the first substrate. The GOA circuit is disposed in the gate driver region of the first substrate, and the GOA circuit includes a plurality of thin film transistor devices. The peripheral conductive wires are disposed in the peripheral region of the first substrate, and the peripheral conductive wires are electrically connected to the GOA circuit. The second substrate is disposed opposite to the first substrate. The sealant is disposed between the first substrate and the second substrate and configured to combine the first substrate and the second substrate. The sealant is disposed in at least a portion of the peripheral region and at least a portion of the gate driver region of the first substrate. The sealant overlaps at least a portion of the peripheral conductive wires and at least a portion of the thin film transistor devices of the GOA circuit in a vertical direction. The display medium layer is disposed between the first substrate and the second substrate and sealed by the sealant. The semi-transparent pattern is disposed on the second substrate, a transmittance of the semi-transparent pattern is between 10% and 80%, and the semi-transparent pattern overlaps the sealant in the vertical direction. The light-shielding pattern is disposed on the second substrate. The light-shielding pattern is disposed corresponding to at least a portion of the peripheral region in the first substrate, and the light-shielding pattern does not overlap the sealant in the vertical direction.

The display device of the present invention includes the semi-transparent pattern disposed on the second substrate and corresponding to the sealant. The semi-transparent pattern may be used for applying a sealant curing process from a side of the second substrate. Therefore, spacing between the peripheral conductive wires in the peripheral region of the first substrate may be reduced to a minimum value according to design rules and manufacturing abilities, and the area of the peripheral region may be reduced substantially for realizing the narrow border or borderless design.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention to users skilled in the technology of the present invention, embodiments are detailed as follows. The embodiments of the present invention are illustrated in the accompanying drawings with numbered elements to clarify the contents and effects to be achieved.

Figure 1:
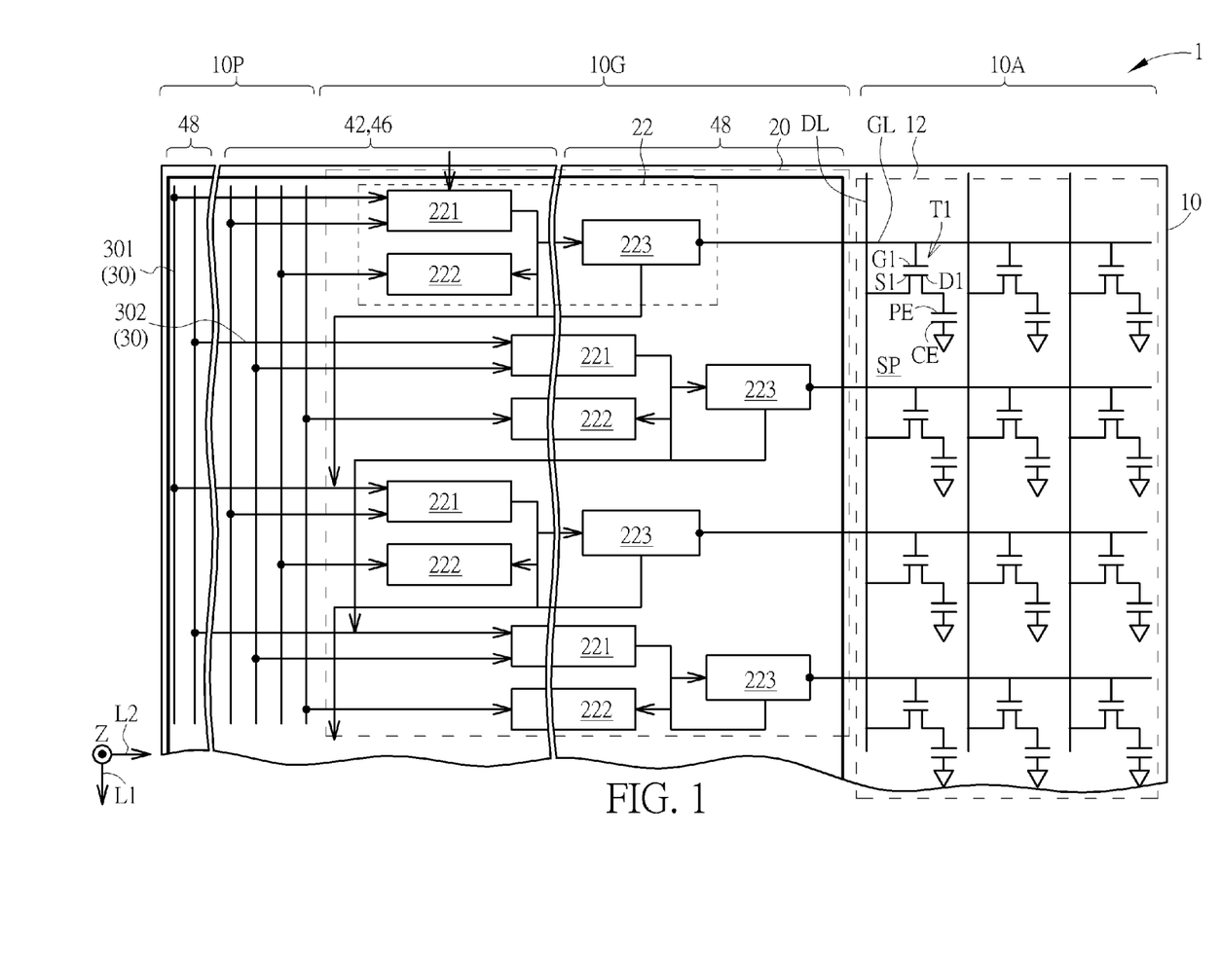
FIG. 1 is a schematic diagram illustrating a display device according to a first embodiment of the present invention.
Figure 2:
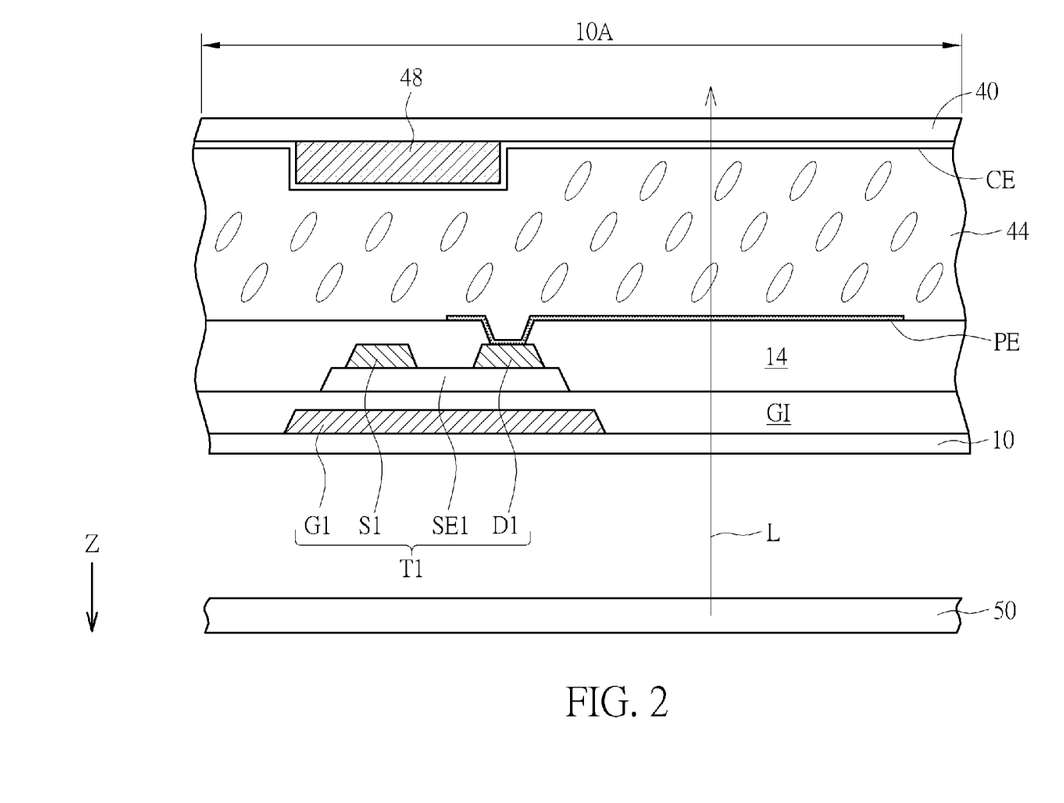
FIG. 2 is a schematic cross-sectional diagram of an active region in the display device according to the first embodiment.
Figure 3:
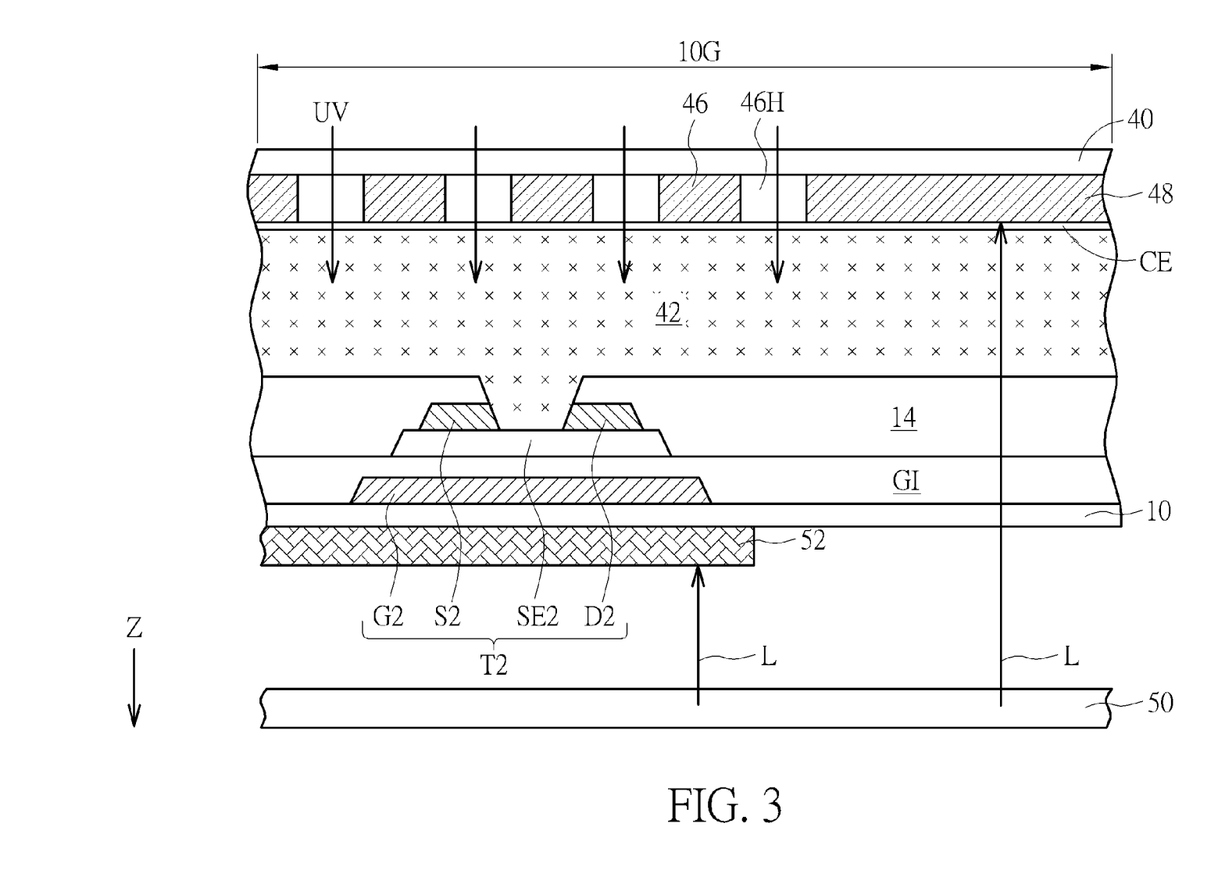
FIG. 3 is a schematic cross-sectional diagram of a gate driver region in the display device according to the first embodiment.
Figure 4:
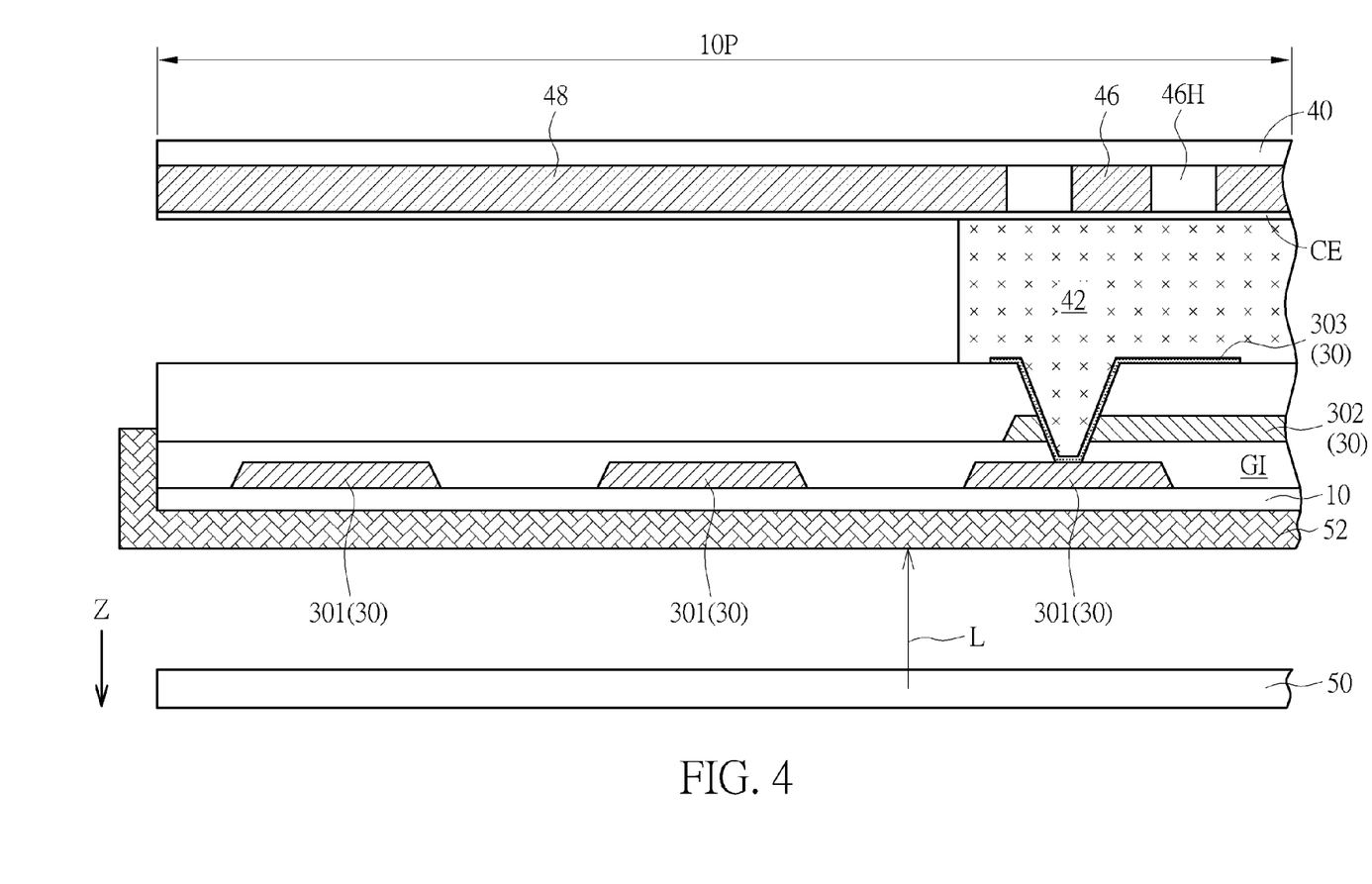
FIG. 4 is a schematic cross-sectional diagram of a peripheral region in the display device according to the first embodiment.
Figure 5:
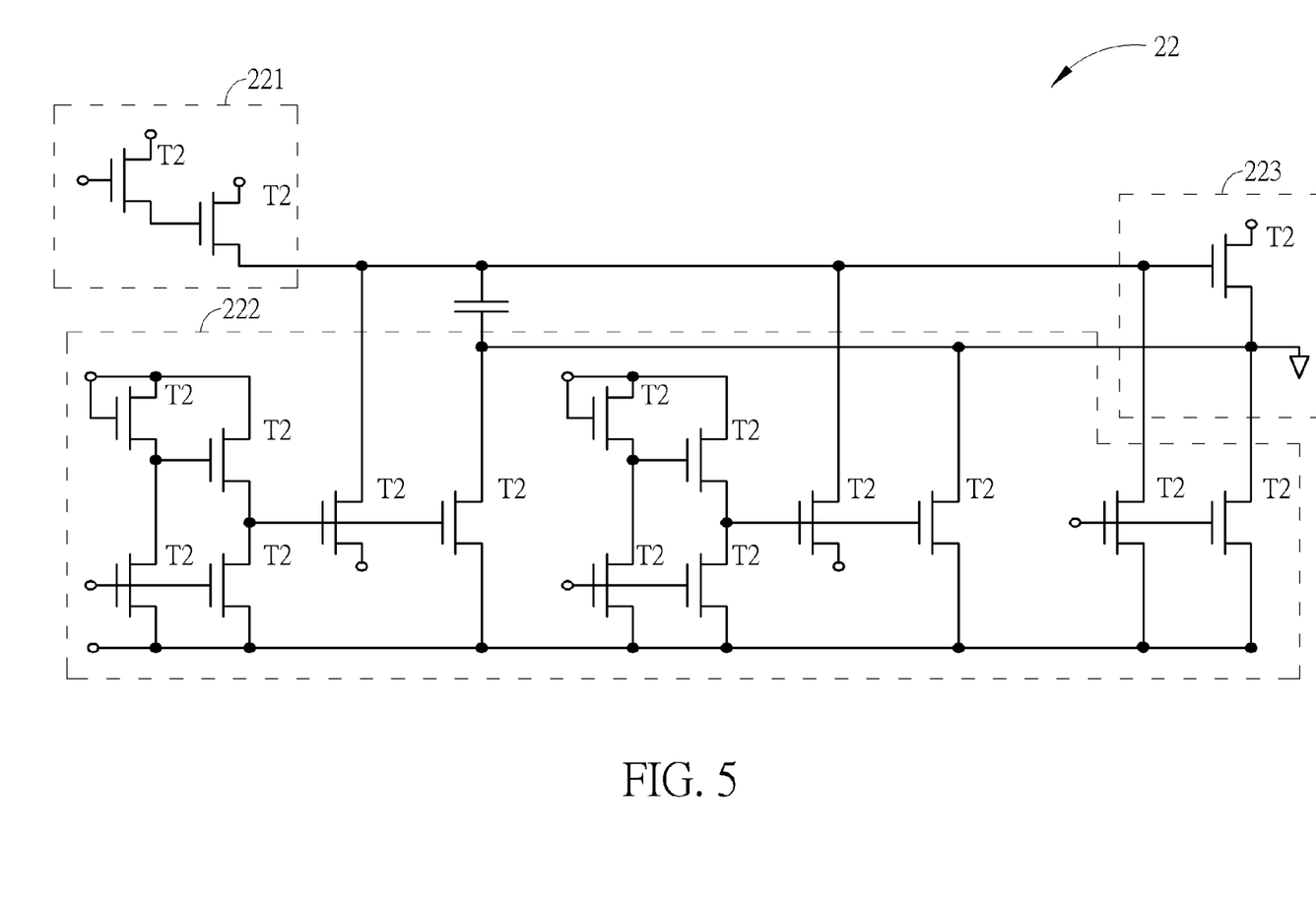
FIG. 5 is a schematic equivalent circuit diagram of a shift register in a gate driver on array (GOA) circuit according to the first embodiment.

Please refer to FIGS. 1-5. FIG. 1 is a schematic diagram illustrating a display device according to a first embodiment of the present invention. FIG. 2 is a schematic cross-sectional diagram of an active region in the display device of this embodiment. FIG. 3 is a schematic cross-sectional diagram of a gate driver region in the display device of this embodiment. FIG. 4 is a schematic cross-sectional diagram of a peripheral region in the display device of this embodiment. FIG. 5 is a schematic equivalent circuit diagram of a shift register in a gate driver on array circuit of this embodiment. A liquid crystal display device is used as an example of the display device in this embodiment. The liquid crystal display device may include a horizontal electric field liquid crystal display device, a vertical electric field liquid crystal display device, an optically compensated bend (OCB) liquid crystal display device, a cholesteric liquid crystal display device, a blue phase liquid crystal display device or other appropriate liquid crystal display devices for example. The display device of the present invention is not limited to the liquid crystal display device and may include other non-self-luminous display devices such as an electrophoresis display device or an electrowetting, or other self-luminous display devices such as an organic electroluminescent display device, an inorganic electroluminescent display device, a plasma display device, or a field emission display device. As shown in FIGS. 1-5, a display device 1 in this embodiment includes a first substrate 10, a pixel array 12, a gate driver on array (GOA) circuit 20, a plurality of peripheral conductive wires 30, a second substrate 40, a sealant 42, a display medium layer 44, a semi-transparent pattern 46, and a light-shielding pattern 48. The first substrate 10 has an active region 10A, a gate driver region 10G, and a peripheral region 10P. The peripheral region 10P is disposed on at least one side of the active region 10A, and the gate driver region 10G is disposed between the active region 10A and the peripheral region 10P. The first substrate 10 may include a transparent substrate such as a glass substrate or a plastic substrate, and the first substrate 10 may be a rigid substrate or a flexible substrate. The pixel array 12 is disposed in the active region 10A of the first substrate 10. The pixel array 12 may include a plurality of gate lines GL and a plurality of data lines DL. The gate lines GL are disposed to cross the data lines DL for defining a plurality of sub-pixels SP arranged in an array configuration. Each of the sub-pixels SP includes a thin film transistor device T1, a pixel electrode PE, and a common electrode CE. The thin film transistor devices T1 are disposed on the first substrate 10, and each of the thin film transistor devices T1 includes a gate electrode G1, a semiconductor channel layer SE1, a gate insulation layer GI, a source electrode S1, and a drain electrode D1.

The gate electrode G1 is electrically connected to a corresponding gate line GL, the source electrode S1 is electrically connected to a corresponding data line DL, and the drain electrode D1 is electrically connected to the pixel electrode PE. The pixel electrode PE is disposed on a protection layer 14 on the first substrate 10. In this embodiment, the common electrode CE is disposed on the second substrate 40, but not limited thereto. In another exemplary embodiment, the common electrode CE may be disposed on the first substrate 10. The material of the pixel electrode PE and the material of the common electrode CE may be a transparent conductive material such as indium tin oxide (ITO) or indium zinc oxide (IZO) respectively, but not limited thereto. The GOA circuit 20 is disposed in the gate driver region 10G of the first substrate 10, and the GOA circuit 20 includes a plurality of thin film transistor devices T2. Each of the thin film transistor devices T2 includes a gate electrode G2, a semiconductor channel layer SE2, the gate insulation layer GI, a source electrode S2, and a drain electrode D2. The GOA circuit 20 is manufactured on the first substrate 10. The thin film transistor devices T2 of the GOA circuit 20 and the thin film transistor devices T1 of the sub-pixels SP may be manufactured by identical processes, but not limited thereto. The semiconductor channel layer SE1 and the semiconductor channel layer SE2 may include various kinds of semiconductor materials such as silicon semiconductor material or oxide semiconductor material. The silicon semiconductor material may include amorphous silicon, poly silicon, single crystal silicon, micro crystal silicon, or nano crystal silicon, and the oxide semiconductor material may include indium gallium zinc oxide (IGZO), but not limited thereto. The peripheral conductive wires 30 are disposed in the peripheral region 10P of the first substrate 10, and the peripheral conductive wires 30 are electrically connected to the GOA circuit 20. The peripheral conductive wires 30 may include a plurality of bus lines 301 and a plurality of connecting conductive lines 302. The bus line 301 may substantially extend in a first direction L1 such as a vertical direction of FIG. 1, and the connecting conductive line 302 may substantially extend in a second direction L2 such as a horizontal direction of FIG. 1, but not limited thereto. Each of the bus lines 301 is electrically connected to a portion of the connecting conductive lines 302 so as to transmit signals to the GOA circuit 20 via the connecting conductive lines 302. In this embodiment, the peripheral conductive wires 30 may be manufactured by the same processes of the thin film transistor devices T1 and the thin film transistor devices T2. For example, the bus lines 301, the source electrode S1, the source electrode S2, the drain electrode D1, the drain electrode D2, and the data lines DL may be made of one identical patterned conductive layer such as a patterned opaque conductive layer, and the patterned opaque conductive layer may be a metal layer or an alloy layer, but not limited thereto. Additionally, the bus lines 301 may be electrically connected to the connecting conductive lines 302 via a bridge conductive line 303. Specifically, the bridge conductive line 303 may be disposed on the protection layer 14, the protection layer 14 may exposed a portion of the bus line 301, the gate insulation layer GI may expose a portion of the connecting conductive line 302, and the bridge conductive line 303 may contact the bus line 301 and the connecting conductive line 302 respectively. In addition, the bridge conductive line 303 and the pixel electrode PE may be made of one identical patterned conductive layer such as a patterned transparent conductive layer, but not limited thereto.

The second substrate 40 is disposed opposite to the first substrate 10. The sealant 42 is disposed between the first substrate 10 and the second substrate 40 and configured to combine the first substrate 10 and the second substrate 40. The sealant 42 is disposed in at least a portion of the peripheral region 10p and at least a portion of the gate driver region 10G of the first substrate 10. The sealant 42 overlaps at least a portion of the peripheral conductive wires 30 and at least a portion of the thin film transistor devices T2 of the GOA circuit 20 in a vertical direction Z. The sealant 42 may be a photo curable sealant which has to be irradiated by light within a specific wavelength range for being solidified and generating adhesive effects. For example, the sealant 42 in this embodiment may be an ultraviolet (UV) curable sealant which has to be fully irradiated by UV light for being solidified and generating the adhesive effects, and the cured sealant 42 may be used to combine the first substrate 10 and the second substrate 40 and seal the display medium layer 44. The display medium layer 44 is disposed between the first substrate 10 and the second substrate 40 and sealed by the sealant 42. The display medium layer 44 in this embodiment may be a liquid crystal layer, but not limited thereto. The semi-transparent pattern 46 is disposed on the second substrate 40, and the semi-transparent pattern 46 overlaps the sealant 42 in the vertical direction Z. The light-shielding pattern 48 is disposed on the second substrate 40. The light-shielding pattern 48 is disposed corresponding to at least a portion of the peripheral region 10p in the first substrate 10, and the light-shielding pattern 48 does not overlap the sealant 42 in the vertical direction Z.

In this embodiment, the semi-transparent pattern 46 is disposed on the second substrate 40 and disposed corresponding to the sealant 42. A whole transmittance of the semi-transparent pattern 46 may be adjusted according to the required exposure dose for solidifying the sealant 42. For example, a whole transmittance of the semi-transparent pattern 46 is substantially between 10% and 80%, and between 30% and 60% preferably, but not limited thereto. In this way, the UV light may penetrate the semi-transparent pattern 46 and irradiate the sealant 42 from a side of the second substrate in a solidifying process of the sealant 42. In other words, the UV light does not irradiate the sealant 42 from a side of the first substrate 10, and the transmittance of the peripheral region 10P of the first substrate 10 will not be a concern. Therefore, spacing between two adjacent peripheral conductive wires 30 in the peripheral region 10P of the first substrate 10 may be reduced to a minimum value according to design rules and manufacturing abilities, and the area of the peripheral region 10P may be reduced substantially.

The semi-transparent pattern 46 in this embodiment may include a light-shielding structural layer capable of blocking light, and the light-shielding structural layer has a plurality of light-pervious openings 46H capable of allowing light to pass through. Accordingly, the UV light may pass through the light-pervious openings 46H and irradiate the sealant 42 in the solidifying process of the sealant 42. The transmittance of the semi-transparent pattern 46 may be adjusted by controlling the area and the amount of the light-pervious openings 46H. The shape of the light-pervious opening 46H may be a hole, a slit, or other closed or non-closed patterns. A material of the semi-transparent pattern 46 may be identical to a material of the light-shielding pattern 48. The semi-transparent pattern 46 and the light-shielding pattern 48 may be formed by one identical material layer such as a black matrix. There may be no light-pervious opening in the light-shielding pattern 48 for completely blocking light substantially. The semi-transparent pattern 46 has the light-pervious openings 46H for making the transmittance range between 10% and 80%, and range between 30% and 60% preferably. Additionally, the peripheral conductive wires 30 and the GOA circuit 20 corresponding to the semi-transparent pattern 46 may reflect the UV light because the peripheral conductive wires 30 and the GOA circuit 20 are made of opaque conductive material such as metal or alloy. In this way, the utilization ratio of the UV light for effectively solidifying the sealant 42 may be enhanced by reflection even the transmittance of the semi-transparent pattern 46 is between 10% and 80% substantially.

The display device 1 in this embodiment may further include a backlight module 50 and a light-shielding frame 52 disposed underneath the first substrate 10 for supporting the first substrate 10 selectively. The backlight module 50 includes at least one light generator configured to provide light L, such as visible light. The light-shielding frame 52 is disposed between the backlight module 50 and the first substrate 10, and the light-shielding frame 52 at least overlaps the semi-transparent pattern 46 in the vertical direction Z. The light-shielding frame 52 may block the light L generated from the light generator for avoid light leakage because the light-shielding frame 52 overlaps the semi-transparent pattern 46. Additionally, the peripheral conductive wires 30 and the GOA circuit 20 corresponding to the semi-transparent pattern 46 will not be visible easily by users even the transmittance of the semi-transparent pattern 46 is between 10% and 80% because the light-shielding frame 52 is disposed underneath the semi-transparent pattern 46 and the light L will not irradiate the peripheral conductive wires 30 and the GOA circuit 20.

In this embodiment, the GOA circuit 20 comprises a plurality of shift registers 22 connected to corresponding gate lines GL respectively for providing gate driving signals. The shift registers 22 include a plurality of stages, and the shift register 22 in an upper stage is connected to the shift register 22 in a lower stage. Each of the shift registers 22 includes an input unit 221, a pull-down unit 222, and a pull-up output unit 223. The connection condition and the allocation of the input units 221, the pull-down units 222, and the pull-up output units 223 in the shift registers 22 of this embodiment may be similar to FIG. 5, but the present invention is not limited to this and may be further modified. The input unit 221 may be connected to at least a portion of the peripheral conductive wires 30, and the pull-up output unit 223 may be connected to the pixel array 12, but not limited thereto. The circuit layout and operation principle of the GOA circuit 20 are well-known to one having ordinary skill in the related territory and will not be redundantly described.

In this embodiment, the sealant 42 overlaps a portion of the peripheral conductive wires 30 and a portion of the thin film transistor devices T2 in the GOA circuit 20 in the vertical direction Z. For example, in the vertical direction Z, the sealant 42 overlaps a portion of the peripheral conductive wires 30 and the thin film transistor devices T2 in the input units 221 and the pull-down units 222 of a portion of the shift registers 22, the sealant 42 does not overlap the thin film transistor devices T2 in the input units 221 and the pull-down units 222 of another portion of the shift registers 22, and the sealant 42 does not overlap the pull-up output units 223 of all shift registers 22, but not limited thereto. In addition, the shape of the semi-transparent pattern 46 substantially overlaps the shape of the sealant 42 in the vertical direction Z. In an exemplary embodiment, the sealant 42 may overlap all of the peripheral conductive wires 30 and the thin film transistor devices T2 in the input units 221 and the pull-down units 222 of a portion of the shift registers 22.

Figure 6:
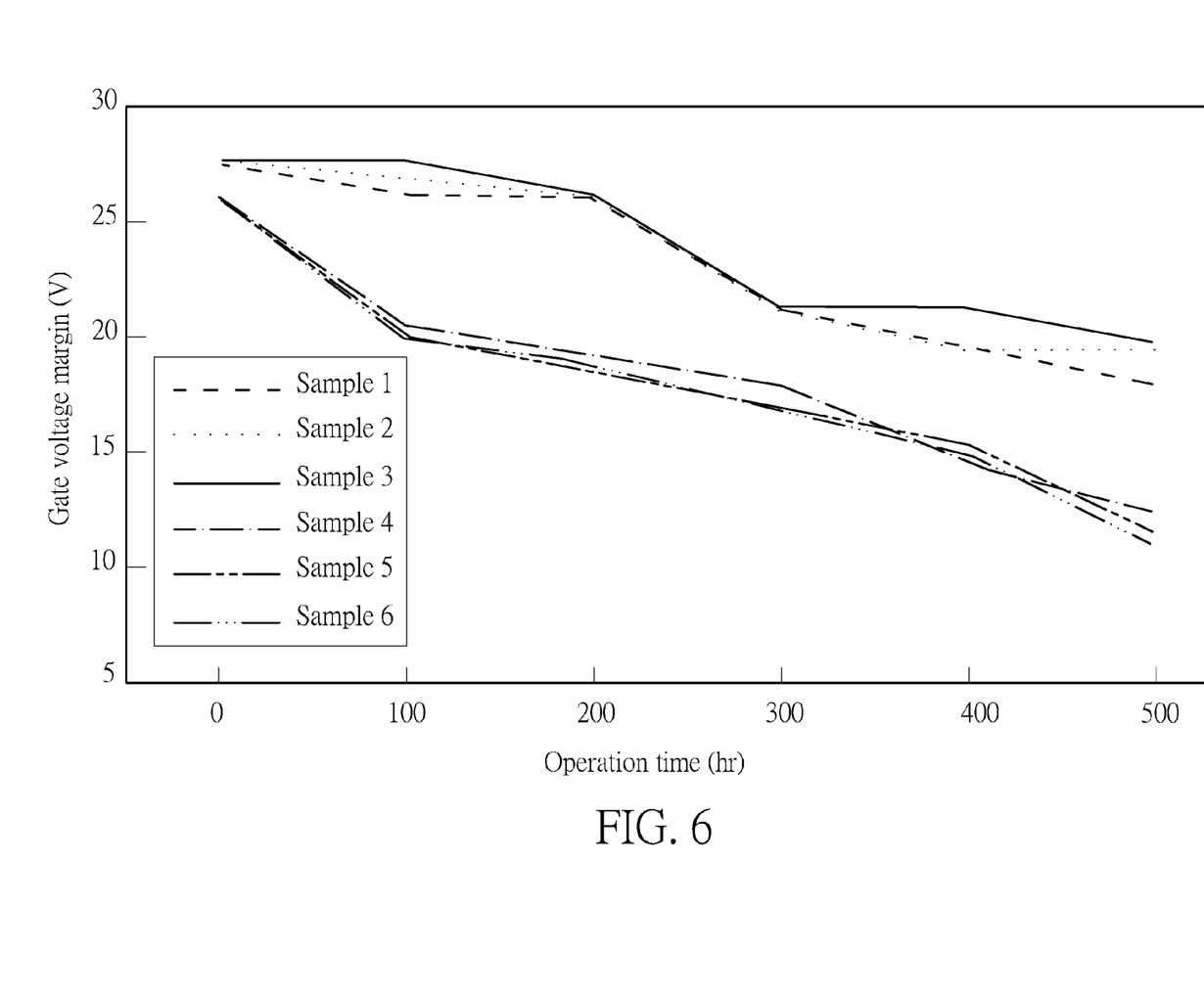
FIG. 6 is a diagram illustrating gate voltage margin experiment results of the GOA circuit in the display device of the present invention actually measured by continuously operation under a high temperature and high humidity environment.

According to actual experiment results, the sealant 42 can be solidified effectively by being irradiated with UV light passing through the semi-transparent pattern 46 from the side of the second substrate 40. Additionally, according to reliability test results, the device characteristics of the thin film transistor devices T2 in the input units 221, the pull-down units 222, and the pull-up output units 223 of all shift registers 22 in the GOA circuit 20 are kept in normal ranges, and the thin film transistor devices T2 can work normally for driving functions after the GOA circuit 20 are irradiated by a light emitting diode (LED) backlight source with 10000 nits for 169 hours from the side of the second substrate 20. Please refer to FIG. 6. FIG. 6 is a diagram illustrating gate voltage margin experiment results of the GOA circuit in the display device of the present invention actually measured by continuously operation under a high temperature and high humidity environment. In FIG. 6, the horizontal axis stands for operation time in hours, and the vertical axis stands for gate signal margin in voltages. The gate voltage margin is an index for judging the functions of the gate driver circuits, and the gate voltage margin stands for a difference between a high gate voltage (Vgh) for turning on the thin film transistor device and a low gate voltage (Vgl) for turning off the thin film transistor device. The specification of the gate voltage margin may be different according to different products, but basically larger gate voltage margin is preferred. In this embodiment, samples 1-3 are gate voltage margins of the GOA circuit in the display device of this embodiment, the semi-transparent pattern is disposed on the second substrate, and the UV light irradiates the sealant for curing from the side of the second substrate. Samples 4-6 are gate voltage margins of a GOA circuit in a display device of a control group, the light-shielding pattern is disposed on the second substrate, and the UV light irradiates the sealant for curing from the side of the first substrate. As shown in FIG. 6, after continuous operation by 500 hours, the gate voltage margins of the GOA circuit in samples 1-3 may be maintained to be about 20 volts, and the gate voltage margins of the GOA circuit in samples 4-6 are lower to the value between 10 volts and 13 volts. According to the results mentioned above, the display device of the present invention shows great reliability in the high intensity irradiation test or the operation test under the high temperature and high humidity environment.

The display device in the present invention is not limited to the embodiment described above. The following description is based on different embodiments in the present disclosure. To simplify the description, the following description will focus on the differences among embodiments rather than the similar parts. Furthermore, the same reference numbers are used to describe similar elements in the description of different embodiments for convenience and clarity.

Figure 7:
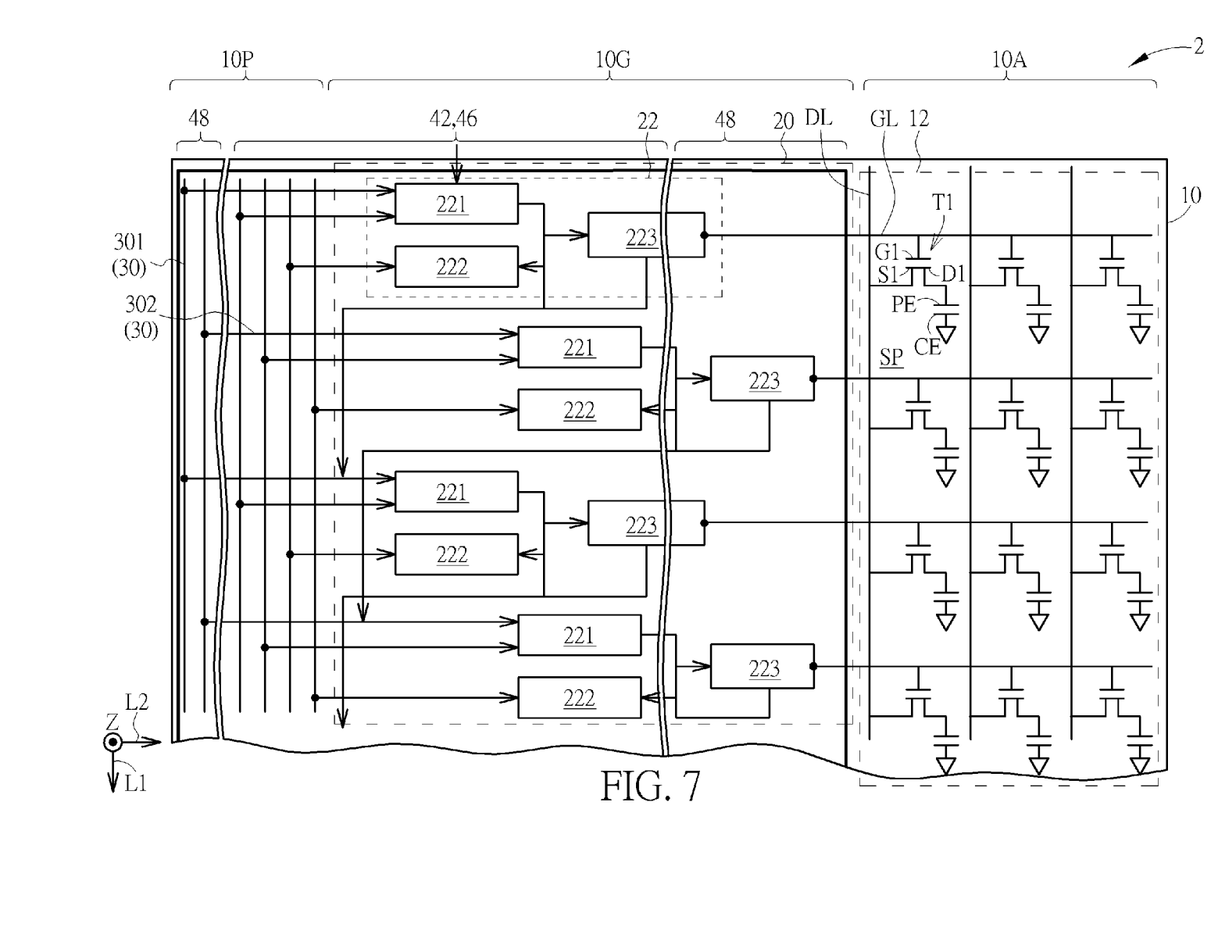
FIG. 7 is a schematic diagram illustrating a display device according to a second embodiment of the present invention.

Please refer to FIG. 7. FIG. 7 is a schematic diagram illustrating a display device according to a second embodiment of the present invention. As shown in FIG. 7, in a display device 2 of this embodiment, the sealant 42 overlaps a portion of the peripheral conductive wires 30 and the thin film transistor devices T2 in the input units 221 and the pull-down units 222 of all of the shift registers 22 in the vertical direction Z. Additionally, the shape of the semi-transparent pattern 46 substantially overlaps the shape of the sealant 42 in the vertical direction Z. In an exemplary embodiment, the sealant 42 may overlap all of the peripheral conductive wires 30 and the thin film transistor devices T2 in the input units 221 and the pull-down units 222 of all of the shift registers 22, and the sealant 42 does not overlap the pull-up output units 223 of all of the shift registers 22.

Figure 8:
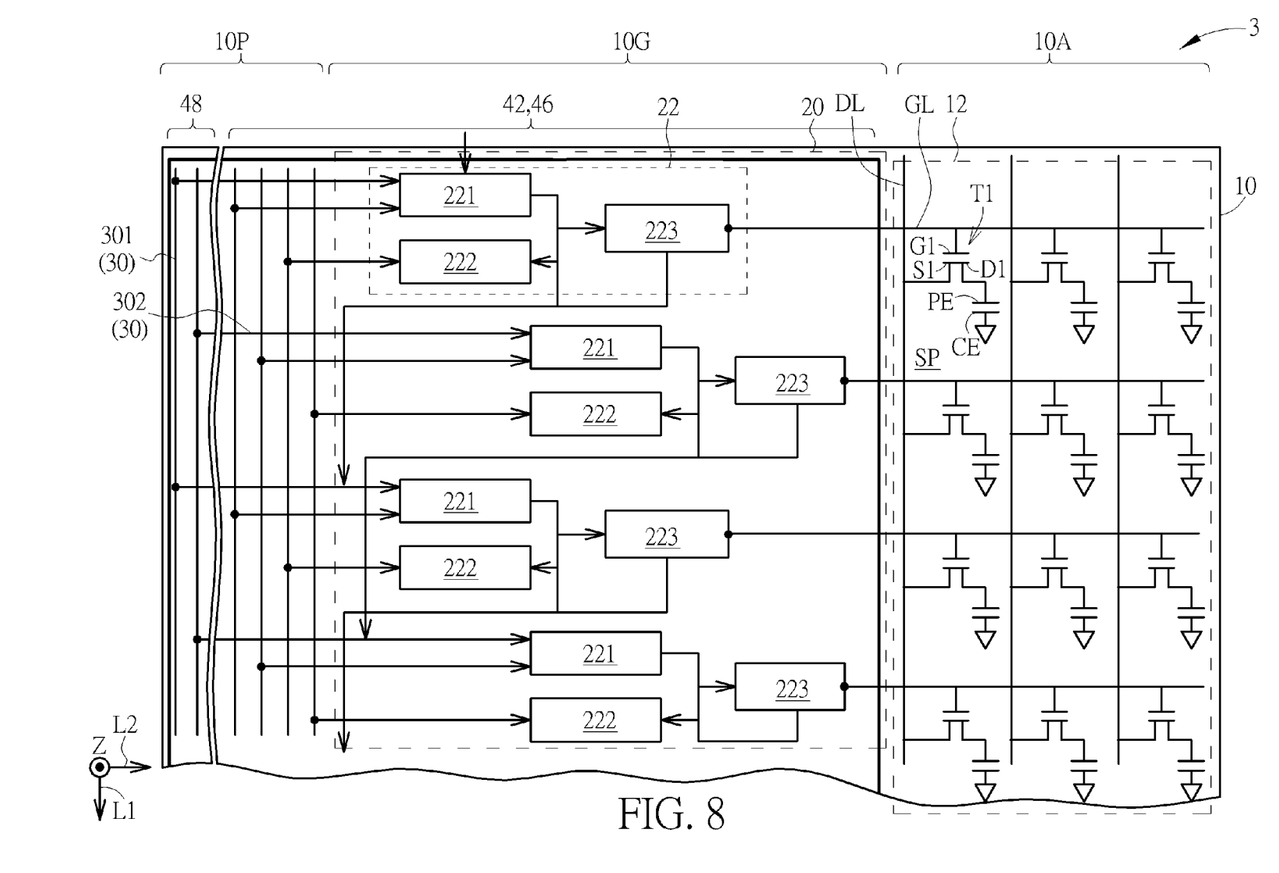
FIG. 8 is a schematic diagram illustrating a display device according to a third embodiment of the present invention.

Please refer to FIG. 8. FIG. 8 is a schematic diagram illustrating a display device according to a third embodiment of the present invention. As shown in FIG. 8, in a display device 3 of this embodiment, the sealant 42 overlaps a portion of the peripheral conductive wires 30 and all of the shift registers 22 in the vertical direction Z. For example, the sealant 42 overlaps a portion of the peripheral conductive wires 30 and the thin film transistor devices T2 in the input units 221, the pull-down units 222, and the pull-up output units 223 of each of the shift registers 22 in the vertical direction Z. Additionally, the shape of the semi-transparent pattern 46 substantially overlaps the shape of the sealant 42 in the vertical direction Z. In an exemplary embodiment, the sealant 42 may overlap all of the peripheral conductive wires 30 and the thin film transistor devices T2 in the input units 221, the pull-down units 222, and the pull-up output units 223 of all of the shift registers 22.

Figure 9:
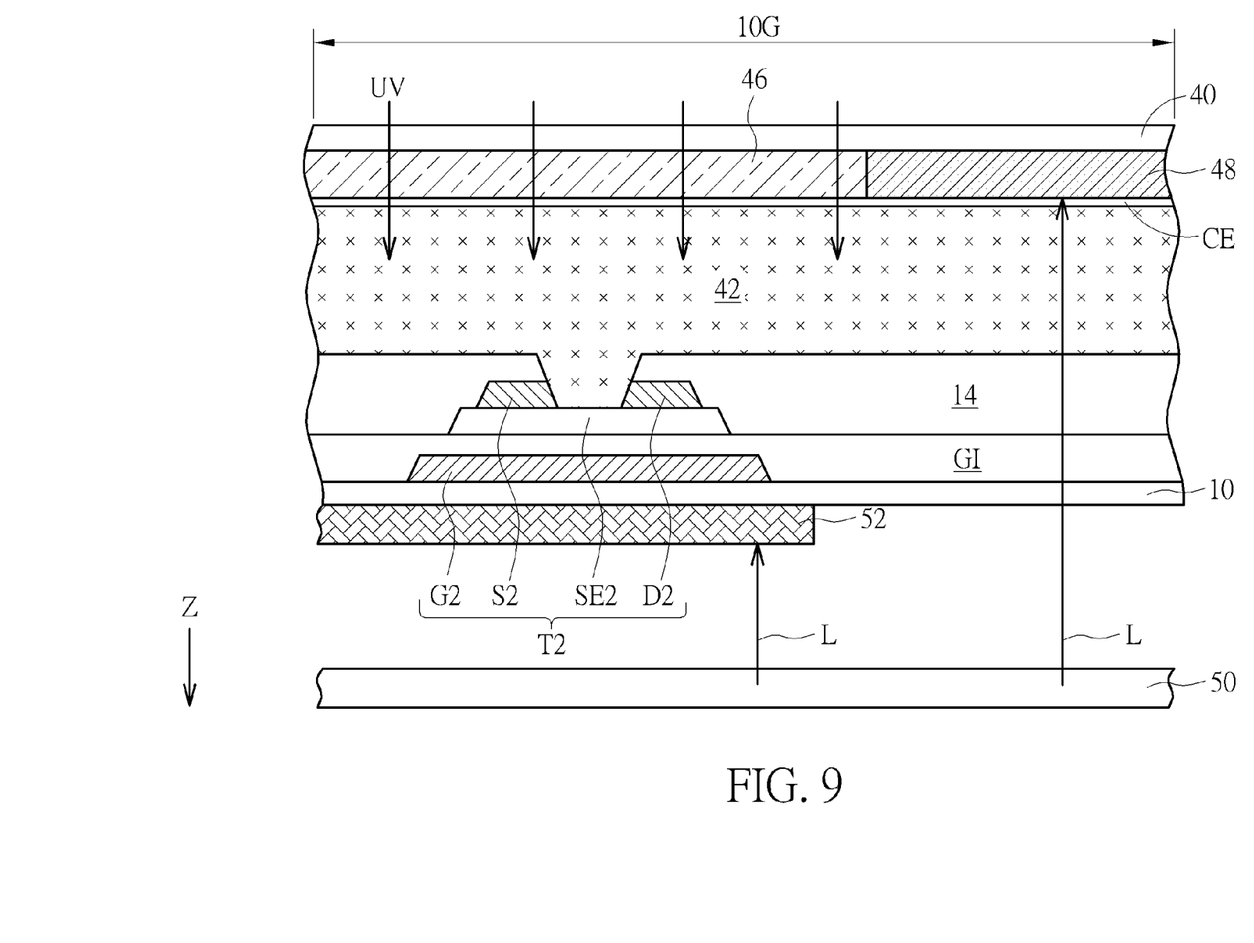
FIG. 9 is a schematic diagram illustrating a semi-transparent pattern of a display device according to a first exemplary embodiment of the present invention.

Please refer to FIG. 9. FIG. 9 is a schematic diagram illustrating a semi-transparent pattern of a display device according to a first exemplary embodiment of the present invention. As shown in FIG. 9, in the first exemplary embodiment, the semi-transparent pattern 46 includes a semi-transparent structural layer. Specifically, the semi-transparent pattern 46 is a complete and intact structural layer, and a material of the semi-transparent pattern 46 is different from a material of the light-shielding pattern 48. The transmittance of the semi-transparent pattern 46 is substantially between 10% and 80%, and between 30% and 60% preferably, but not limited thereto. In this embodiment, the transmittance of the semi-transparent pattern 46 may be adjusted by using different materials or modifying the thickness of the semi-transparent pattern 46, and the transmittance of the semi-transparent pattern 46 in this embodiment is not adjusted by design of light-pervious openings.

Figure 10:
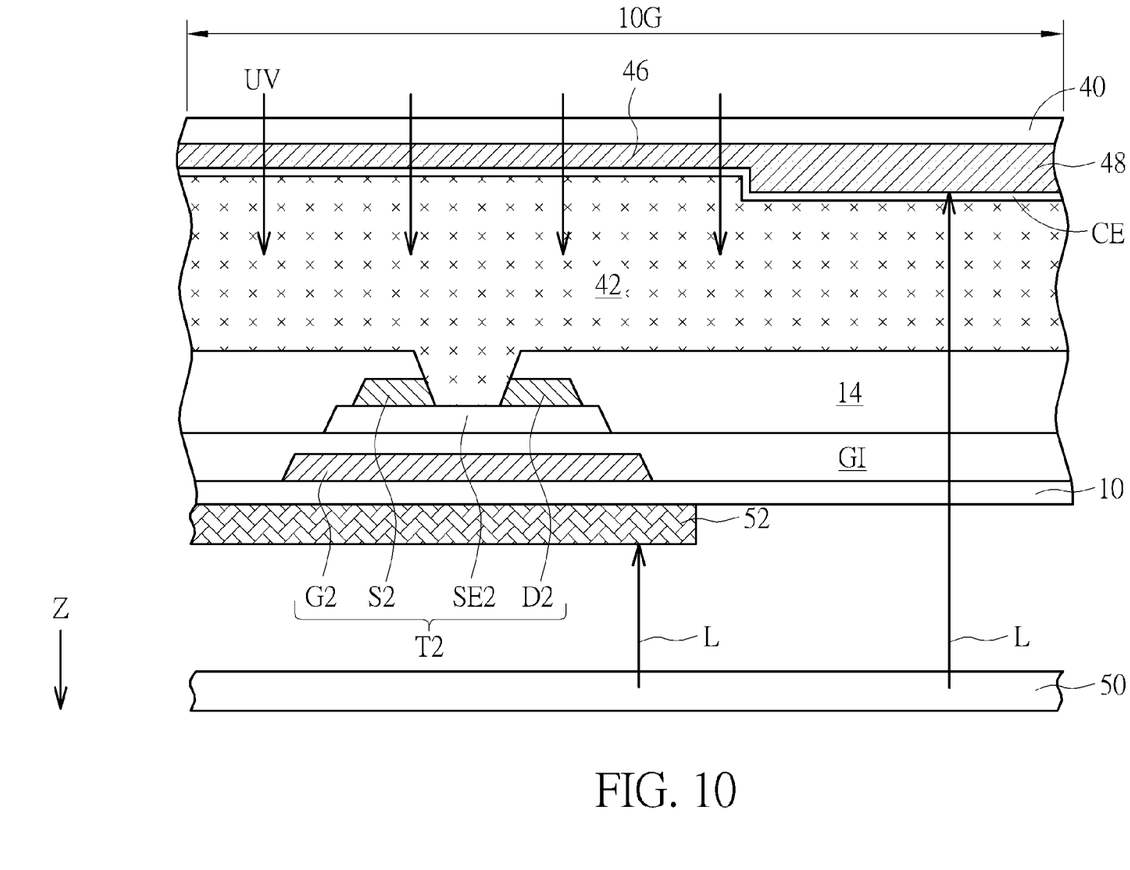
FIG. 10 is a schematic diagram illustrating a semi-transparent pattern of a display device according to a second exemplary embodiment of the present invention.

Please refer to FIG. 10. FIG. 10 is a schematic diagram illustrating a semi-transparent pattern of a display device according to a second exemplary embodiment of the present invention. As shown in FIG. 10, in the second exemplary embodiment, the material of the semi-transparent pattern 46 is identical to the material of the light-shielding pattern 48, and a thickness of the semi-transparent pattern 46 is less than a thickness of the light-shielding pattern 48. In other words, the transmittance of the semi-transparent pattern 46 may be adjusted to be substantially between 10% and 80%, and between 30% and 60% preferably by reducing the thickness of the semi-transparent pattern 46 while the material of the semi-transparent pattern 46 is identical to the material of the light-shielding pattern 48.

To summarize the above descriptions, the display device of the present invention includes the semi-transparent pattern disposed on the second substrate (the upper substrate) and corresponding to the sealant. The solidifying process of the sealant may be performed from the side of the second substrate. The spacing between the peripheral conductive wires in the peripheral region of the first substrate may be reduced to a minimum value according to design rules and manufacturing abilities, and the area of the peripheral region may be reduced substantially for realizing the narrow border or borderless design. Additionally, according to the reliability test results, the sealant can be solidified without negative influences by being irradiated with the UV light passing through the semi-transparent pattern from the side of the second substrate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device, comprising:
    a first substrate having an active region, a gate driver region, and a peripheral region, wherein the peripheral region is disposed on at least one side of the active region, and the gate driver region is disposed between the active region and the peripheral region;
    a pixel array disposed in the active region of the first substrate;
    a gate driver on array (GOA) circuit disposed in the gate driver region of the first substrate, wherein the GOA circuit comprises a plurality of thin film transistor devices;
    a plurality of peripheral conductive wires disposed in the peripheral region of the first substrate, wherein the peripheral conductive wires are electrically connected to the GOA circuit;
    a second substrate disposed opposite to the first substrate;
    a sealant disposed between the first substrate and the second substrate and configured to combine the first substrate and the second substrate, wherein the sealant is disposed in a portion of the peripheral region and at least a portion of the gate driver region, and the sealant overlaps a portion of the peripheral conductive wires and at least a portion of the thin film transistor devices of the GOA circuit in a vertical direction;
    a display medium layer disposed between the first substrate and the second substrate and sealed by the sealant;
    a semi-transparent pattern disposed on the second substrate, wherein a transmittance of the semi-transparent pattern is between 10% and 80%, and the semi-transparent pattern overlaps the sealant in the vertical direction; and
    a light-shielding pattern disposed on the second substrate, wherein the light-shielding pattern is disposed corresponding to a portion of the peripheral conductive wires of the peripheral region in the first substrate, and the light-shielding pattern does not overlap the sealant in the vertical direction.

2. The display device of claim 1, wherein the semi-transparent pattern comprises a light-shielding structural layer, and the light-shielding structural layer has a plurality of light-pervious openings.

3. The display device of claim 1, wherein the semi-transparent pattern comprises a semi-transparent structural layer.

4. The display device of claim 1, wherein a material of the semi-transparent pattern is identical to a material of the light-shielding pattern, and a thickness of the semi-transparent pattern is less than a thickness of the light-shielding pattern.

5. The display device of claim 1, wherein a material of the semi-transparent pattern is different from a material of the light-shielding pattern.

6. The display device of claim 1, wherein the GOA circuit comprises a plurality of shift registers, and each of the shift registers comprises an input unit, a pull-down unit, and a pull-up output unit, wherein the input unit is connected to at least a portion of the peripheral conductive wires, and the pull-up output unit is connected to the pixel array.

7. The display device of claim 6, wherein the sealant only overlaps the input units and the pull-down units of a portion of the shift registers in the vertical direction.

8. The display device of claim 6, wherein the sealant overlaps the input unit and the pull-down unit of each of the shift registers in the vertical direction.

9. The display device of claim 6, wherein the sealant overlaps the input unit, the pull-down unit, and the pull-up output unit of each of the shift registers in the vertical direction.

10. The display device of claim 1, further comprising a backlight module and a light-shielding frame disposed underneath the first substrate, wherein the backlight module comprises at least one light generator configured to provide light, the light-shielding frame is disposed between the backlight module and the first substrate, and the light-shielding frame at least overlaps the semi-transparent pattern in the vertical direction.

* * * * *